THERMISTOR CONTROL CIRCUIT

Filed Nov. 25, 1947 3 Sheets-Sheet 1

INVENTORS: E. LAKATOS
B. MCMILLAN
BY N. S. Ewing
ATTORNEY

THERMISTOR CONTROL CIRCUIT

Filed Nov. 25, 1947 3 Sheets-Sheet 2

INVENTORS: E. LAKATOS
B. McMILLAN
BY N. D. Ewing
ATTORNEY

Jan. 13, 1953

E. LAKATOS ET AL 2,625,606

THERMISTOR CONTROL CIRCUIT

Filed Nov. 25, 1947

3 Sheets-Sheet 3

INVENTORS: E. LAKATOS
B. McMILLAN
BY N. S. Ewing
ATTORNEY

Patented Jan. 13, 1953 2,625,606

UNITED STATES PATENT OFFICE 2,625,606

THERMISTOR CONTROL CIRCUIT

Emory Lakatos, Cranford, and Brockway McMillan, Summit, N. J., assignors to Bell Telephone Laboratories, Incorporated, New York, N. Y., a corporation of New York Application November 25, 1947, Serial No. 787,984

23 Claims. (Cl. 178—44)

This invention relates to electrical circuits and methods employing a plurality of current-controlled variable impedance elements and it has for its principal object the maintenance of a predetermined constant relation between the impedance values of the elements throughout a range of values of control currents.

A more particular object is to maintain the resistance values of a pair of such impedance elements exactly equal to each other throughout the range of variation of control currents despite dissimilarity of the resistance versus control-current characteristics of the two elements.

A further object is to maintain exactly equal the respective gains of a pair of amplifiers that are simultaneously varied in gain by a common control current operative on respective gain-controlling variable resistors that have slightly dissimilar characteristics.

Still another object is to reduce the inaccuracy present in certain types of voltage multiplying circuits due to dissimilarity of the characteristics of the current-controlled variable impedance elements employed therein.

One type of current-controlled device to which the invention is particularly applicable is the thermistor. The term "thermistor" designates a circuit element whose electrical resistance varies rapidly with changes in temperature. In contrast with metals, which have small positive temperature coefficients of resistance, thermistors are usually made from a class of materials, known as semi-conductors, which have relatively large negative coefficients. According to the present invention, voltage from an alternating current source, preferaby at a frequency considerably removed from the operating frequency of the system of which the thermistors are a part, is applied at a comparatively low level to each of the two thermistors and the resulting currents are compared by electrical means. Variations of the two currents from a predetermined relation are detected and employed to modify the resistance of one or both of the thermistors to regain the original relationship.

A more thorough understanding of the invention may be obtained by a study of the following detailed description of several specific embodiments. These embodiments are shown in the drawings, in which.

Figure 1:
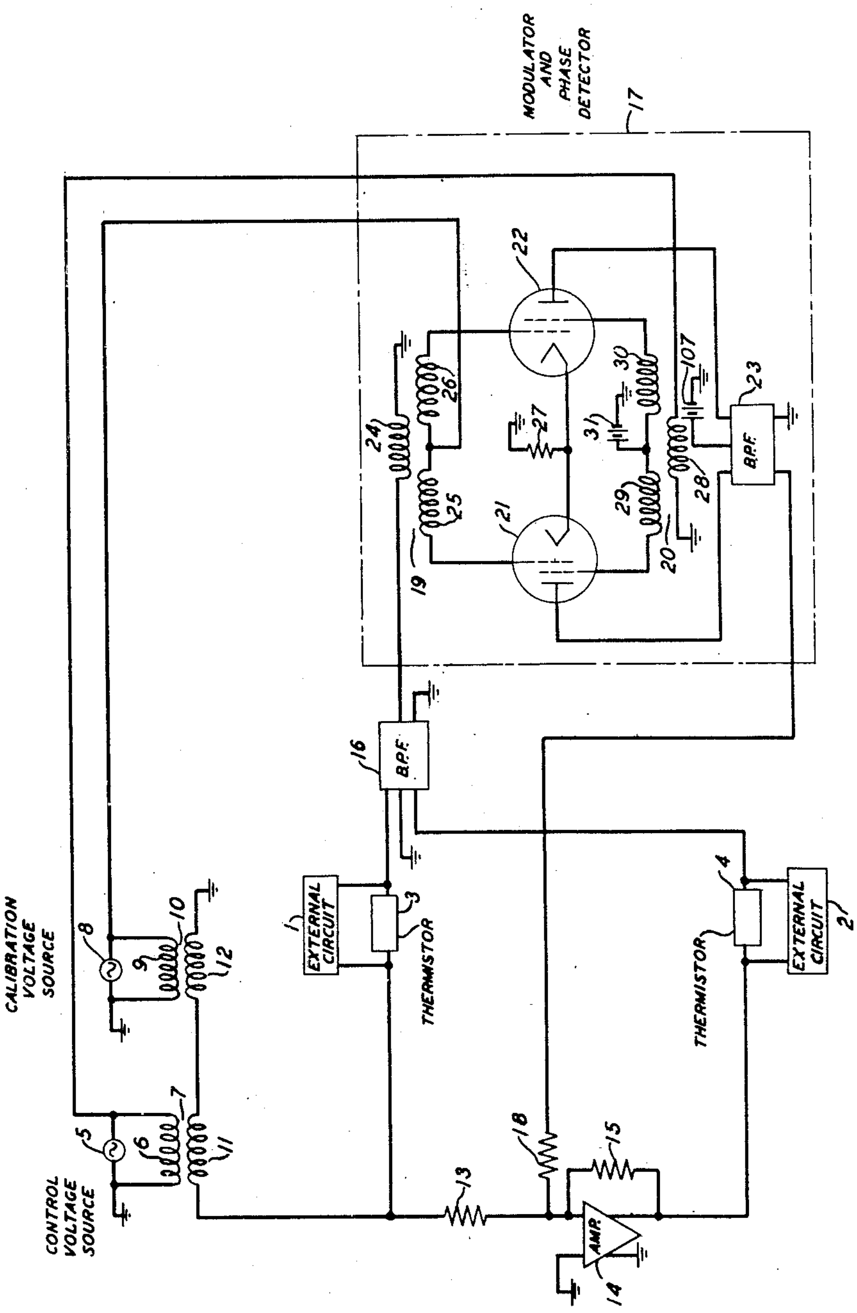
Fig. 1 represents one embodiment of the invention which is capable of relatively general application and illustrates some of the principles involved.

In Fig. 1, two substantially identical external circuits 1 and 2 are operating on alternating current which is, for all practical purposes, confined to those circuits. Two self-heated thermistors 3 and 4 are connected, respectively, to each of the external circuits 1 and 2 in such a manner as to enable a change in the resistance of a thermistor to change some property of the external circuit with which it is associated. For example, each thermistor might control the gain of an amplifier circuit, as in Fig. 2.

An alternating current source 5 of control voltage operates at a frequency quite small with respect to the operating frequency of the external circuits 1 and 2. The primary winding 6 of a transformer 7 is connected across the terminals of the control source 5. One side of the control source 5 is grounded. An alternating current source 8 of calibration voltage operates at a frequency intermediate between the frequency of the control source 5 and the operating frequency of the external circuits 1 and 2. The primary winding 9 of a second transformer 10 is connected across the terminals of the calibration source 8. One side of the calibration source 8 is also grounded. The secondary winding 11 of the first transformer 7 is connected in series with the secondary winding 12 of the second transformer 10. The remaining terminal of the secondary winding 12 of the second transformer 10 is grounded.

The remainder of the circuit is as follows: The free end of the secondary winding 11 of the first transformer 7 is connected to one side of one of the thermistors 3. This same side of the thermistor 3 is connected through a resistance 13 to one input terminal of a high gain amplifier 14. The other amplifier input terminal is grounded. One output terminal of the amplifier 14 is also grounded and the other output terminal is connected to the other thermistor 4. A shunting resistor 15, connected between the ungrounded input and output terminals of the amplifier 14, furnishes a negative feedback circuit. The other sides of the thermistors 3 and 4 are connected to respective input terminals of a band-pass filter 16, designed to pass only the calibration frequency. A third input terminal of the band-pass filter 16 is grounded. One output terminal of the band-pass filter 16 is grounded and the other is connected to a modulator and phase detector 17. A final connection goes from the modulator and phase detector 17 through a resistor 18 to a point between the resistor 13 and the ungrounded input terminal of the amplifier 14.

The modulator and phase detector 17 comprises two transformers 19 and 20, two multigrid tubes 21 and 22, and a band-pass filter 23. The primary winding 24 of one transformer 19 is connected between the ungrounded output terminal of the band-pass filter 16 and ground. The secondary of the transformer 19 is center-tapped and the portions 25 and 26 thus formed are connected to the control grids of tubes 21 and 22, respectively. The midpoint is connected to the ungrounded side of the calibrating voltage source 8. The cathodes of the tubes 21 and 22 are connected together and are grounded through a common biasing resistor 27. The primary 28 of the other transformer 20 is connected between ground and the ungrounded side of the control voltage source 5. The secondary of this transformer 20 is also center-tapped and the portions 29 and 30 thus formed are connected to the screen grids of tubes 21 and 22, respectively. The mid-point is connected to the positive terminal of a battery 31. The negative terminal of the battery 31 is grounded. The plates of tubes 21 and 22 are connected to input terminals of the band-pass filter 23, and a third input terminal is connected to the positive side of a battery 107, the negative side of which is grounded. One output terminal of the band-pass filter 23, the filter being designed to pass only the control frequency, is grounded and the other is connected to the resistance 18.

The approximate resistance of each of the thermistors 3 and 4 is under the control of the control voltage source 5. The first thermistor 3 is fed directly from the secondary 11 of the control voltage transformer 7, since the low input impedance of the band-pass filter 16 effectively shorts the low frequency control current to ground. Current also flows from the same secondary winding 11 through the resistance 13 to the input of the shunt feedback amplifier 14. This input is very nearly at ground potential due to feedback action and, for all practical purposes, the control current flows to ground at this point.

Negative feedback action of the amplifier 14 gives an output voltage equal to that appearing across the resistor 13. Therefore, a voltage is impressed on the second thermistor 4 which is equal to that impressed on the first thermistor 3 by the control voltage source 5. The amplifier 14 also contains some means, such as a phase reversing transformer, for reversing the phase of the impressed voltage. Thus, the currents through the thermistors 3 and 4 are opposite in phase. The circuit is completed at the input side of the band-pass filter 16, since the control current is effectively shorted to ground. Changes in the control signal amplitude cause changes in the currents of that frequency flowing in the thermistors 3 and 4 and thus control their resistances.

Voltage from the calibration source 8 is impressed on the thermistors 3 and 4 in much the same manner as is the control voltage. Insofar as the calibration source 8 is concerned, all circuit components play substantially the same role as before, with the exception of the band-pass filter 16 which transmits calibration frequency current. There is no short to ground for this current. As with the control voltage, the calibration voltage sets up currents in the thermistors 3 and 4. The phase reversing feature of the amplifier 14 causes these two currents to be opposite in phase. The two currents are summed in the input of the band-pass filter 16. The amplitude of the output is proportional to the difference between the amplitudes of the two currents because of the phase reversal of the current through the second thermistor 4. The phase of the output depends on which current is the larger. The modulator and phase detector 17 is sensitive to both amplitude and phase of the difference current and modulates the signal from the control voltage source so that the current output of its band-pass filter 23, or error signal, has both the amplitude and phase of the difference current and has the frequency of the control signal. Finally, this error signal is introduced through the resistance 18 to the ungrounded input terminal of the amplifier 14. As a result, a voltage equal to the sum or difference, depending on the direction of error, of the control voltage and the error voltage developed across the resistance 18 acts on the second thermistor 4. This forces the second thermistor 4 to adjust itself until the error current vanishes; that is, until the resistances of the two thermistors 3 and 4 become equal.

Figure 2:
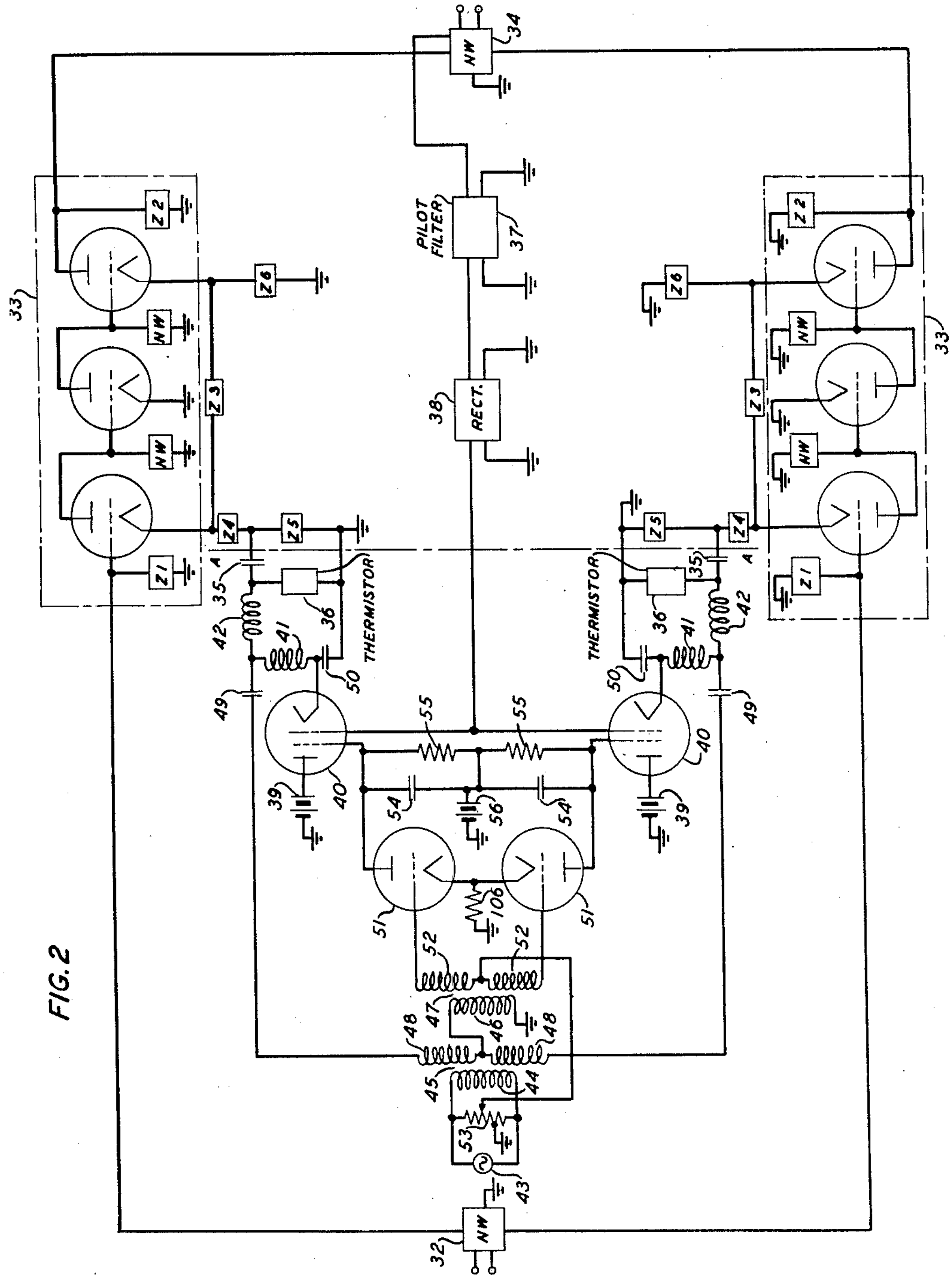
Fig. 2 shows a wave transmission system employing two similar amplifiers and means in accordance with the invention for regulating the gains of those amplifiers equally.

Another embodiment of the invention is shown in Fig. 2. Since the system is substantially symmetrical, like designations will be used to denote corresponding circuit elements in the following description and in the drawing.

The present embodiment comprises a signal transmission system which contains two similar amplifiers 33 in parallel with each other. Either of these amplifiers 33 is able to take over the full load of the system in case of failure of the other. The general level of the gains of the two amplifiers 33 is determined by a pilot voltage which is transmitted over the line along with the signal.

A signal transmission line is connected to the input terminals of a coupling network 32. One output terminal of the network 32 is grounded and the other two terminals, balanced to ground, are connected, respectively, through similar amplifiers 33 to the balanced input terminals of a second coupling network 34. A third input terminal of the second network 34 is grounded. The output terminals of the second network 34 are connected to a continuation of the signal transmission line.

Each amplifier 33 is a three-stage negative feedback amplifier with a coupling impedance Z1 in the input circuit of the first stage, interstage networks NW between the first and second and the second and third stages, and a coupling impedance Z2 in the output circuit of the third stage. The incoming signal is fed into the amplifier between the control grid of the first stage and ground, while the output is taken off from between the plate of the final stage and ground.

Each amplifier 33 has a feedback circuit comprising an impedance Z3 connected between the cathode leads of the first and third stages, a coupling impedance Z6 connected between the cathode lead of the third stage and ground, and a coupling circuit including an impedance Z4 in series with another impedance Z5 connected between the cathode lead of the first stage and ground. Impedance Z5 is shunted by a condenser 35 in series with a self-heated thermistor 36. Due to negative feedback, the gain of each amplifier 33 is dependent upon the resistance of the thermistor 36 in its feedback circuit.

The general level of the gain of each amplifier 33 is under the control of amplitude variations of a pilot voltage which is transmitted along the line at a frequency which is different from the main signal frequency of the line. This pilot signal is recovered from the output coupling network 34. A pilot filter 37 is connected across the mixed outputs of the amplifiers 33 and is designed to pass only current of the pilot frequency. The output of the pilot filter 37 is fed into a rectifier 38. The output of the rectifier 38 is then available for use in regulating the gains of the amplifiers 33.

In each half of the circuit, a battery 39 supplies direct current to the thermistor 36 through a multigrid tube 40. The direct current so supplied is the principal heating current for the thermistor 36. The negative terminal of the battery 39 is connected to ground, while the positive terminal is connected to the plate of the tube 40. The cathode of the tube 40 is then connected to a series combination of two inductances 41 and 42 which are, in turn, connected to a point between the condenser 35 and the thermistor 36. Since the condenser 35 blocks direct current, the main heating current flows through the thermistor 36 to ground, completing the circuit. This main heating current is varied by applying rectified pilot voltage from the rectifier 38 to the control grid of the tube 40. The tube acts as a valve and variations of the amplitude of the rectified pilot voltage result in changes in the amount of direct current flowing through the thermistor 36. These current changes affect the resistance of the thermistor 36 and thus determine the general level of the gain of the amplifier 33.

In the present embodiment of the invention, the amplifier circuits 33 are designed to operate at frequencies in the neighborhood of one hundred kilocycles and over. Hereafter, such frequencies will be referred to as radio frequencies. Similarly, frequencies in the neighborhood of one kilocycle, which will be referred to later, will be called audio frequencies, and zero frequency current and direct current will be considered synonymous. The use of these frequency designations is merely for the sake of brevity and clarity and is not intended to limit the application of the invention to the stated frequency ranges.

If the two thermistors 36 had identical resistances for equal heating currents, over a broad range of heating current amplitudes, the two amplifiers 33 would have identical gains over that range. To obviate the need for thermistors having such identical resistance versus heating current characteristics, which it might be difficult if not practically impossible to obtain, this embodiment of the invention comprises means to equalize the resistances of the two thermistors 36 for substantially all pilot signal amplitudes and thus insure identical amplifier gains over that range.

An audio frequency voltage source 43 is connected to the primary winding 44 of a transformer 45. The secondary winding of the transformer 45 is center-tapped and one end of the primary winding 46 of a second transformer 47 is attached at the mid-point. The other end of that second primary winding 46 is grounded. The two portions 48 of the secondary winding of the first transformer 45 form two arms of a bridge circuit. In each half of the circuit, the free end of the secondary winding portion 48 is connected through several circuit elements to the ungrounded side of the thermistor 36. These circuit elements consist of a series combination of a condenser 49 which has a low impedance at audio frequencies and the inductance 42. The other inductance 41, which is connected between the first inductance 42 and the cathode of the tube 40 has a high impedance at audio frequencies and serves as an audio frequency choke, forcing substantially all the audio frequency current to pass through the first inductance 42 to the thermistor 36. The first inductance 42 presents a high impedance at radio frequencies and a low impedance at audio frequencies, acting as a radio frequency choke and thus limiting radio frequency current to the amplifier 33 and its feedback circuit. The condenser 35 presents a low impedance at radio frequencies, allowing relatively free passage of radio frequency current, and a high impedance at audio frequencies. The condenser 35 thus serves to block substantially all audio frequency and direct current from any portion of the feedback circuit but the thermistor 36. The path for audio frequency current, then, is through the thermistor 36 to ground, completing the bridge. A third condenser 50, offering low impedance at audio frequencies, is connected between the cathode of the tube 40 and ground.

Since the system is symmetrical, all corresponding circuit elements are substantially equal. Therefore, if the resistances of the two thermistors 36 are equal, the bridge formed by the two portions 48 of the secondary winding of the transformer 45 and the two thermistors 36 will be balanced. If the resistances of the two thermistors 36 are not equal, the bridge will not be balanced and an audio frequency voltage will appear across the primary winding 46 of the second transformer 47. The phase of this unbalance voltage will depend upon the direction of the unbalance in the bridge.

A phase sensitive detector is used to convert bridge unbalance into a properly phased direct current control signal. This signal takes the form of a differential voltage and is applied to the screen grids of the tubes 40. The differential effect stems from the fact that one grid is raised in potential while the opposite one is reduced. Two triodes 51 form the basis of the phase sensitive detector. The secondary winding of the second transformer 47 is center-tapped, forming two portions 52. In each half of the circuit, the end of this portion 52 is connected to the grid of the triode 51. A potentiometer 53 is connected with its resistance element in parallel with the audio frequency source 43. The resistance element is grounded at an intermediate point and the movable contact is connected to the center point of the secondary winding of the second transformer 47. In each half of the circuit, the plate of the triode 51 is connected to the screen grid of the multigrid tube 40. The cathodes of the two triodes 51 are connected through a common biasing resistor 106 to ground. A pair of series condensers 54 presenting low impedances at audio frequencies is connected between the plates of the two triodes 51. Each condenser 54 is shunted by a resistance 55 in order to form a path for direct current. A battery 56 is connected from a point between the two condensers 54 to ground, the positive terminal being connected to the condensers and the negative terminal to ground.

The unbalance voltage appearing in the primary winding 46 of the second transformer 47 also appears in the secondary. This voltage alone would swing the grid of one triode 51 positive while swinging the other negative. The voltage appearing on the movable contact of the potentiometer 53 swings the two grids equally and in phase. It is desirable that the amplitude of this voltage appearing on the movable contact be greater than the greatest value of unbalanced voltage that is likely to appear in the secondary winding of the second transformer 47. As a result, any unbalance voltage present adds to the positive and negative excursions of one grid and detracts from those of the other. By proper selection of the magnitude of the biasing resistor 106, the two triodes 50 are biased to conduct only on positive grid swings, giving an output wave with a direct current component. The resistance 55 and capacitance 54 networks act as low-pass filters, the condensers 54 by-passing nearly all audio frequency and above components of the output wave and essentially direct voltages appearing across the resistances 55. Thus, under control of the unbalance voltage, a differential direct voltage is applied to the screen grids of the tubes 40. The potential difference between screen grid and ground is raised for one tube while it is being lowered for the other. The opposite effect is achieved through a bridge unbalance in the other direction. The valve action of the multigrid tubes 40 enables variations in screen grid potential to control the flow of the main thermistor 36 heating current. As a result, the resistance of one thermistor 36 is reduced while that of the other is raised until the two resistances are equal.

Figure 3:
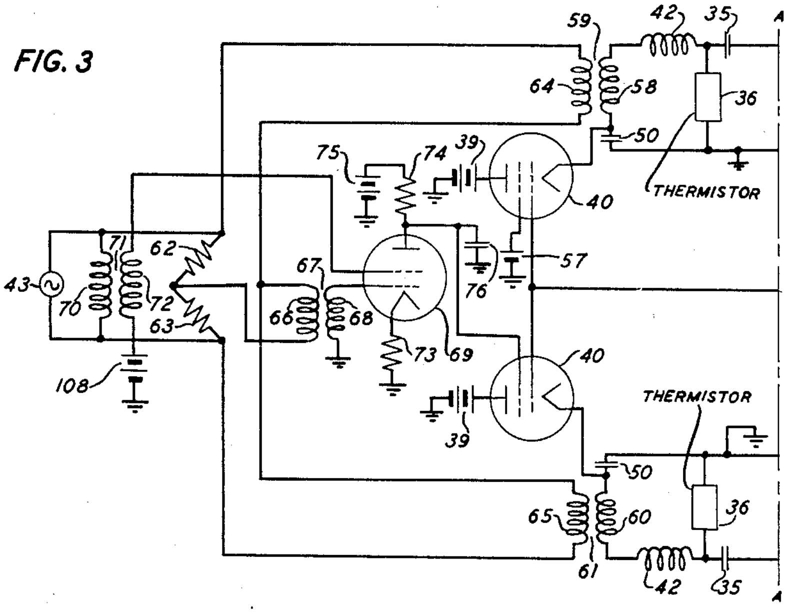
Fig. 3 shows an alternative circuit in accordance with the invention for regulating equally the gains of the amplifiers of Fig. 2.

A further embodiment of the invention is shown in Fig. 3. The circuit shown is an alternative arrangement for detecting and eliminating thermistor unbalance in the system of Fig. 2. The output connections of Fig. 3 apply to Fig. 2 along the line A—A. Elements common to both drawings are given like numerical designations.

As in the previous example, the two amplifier circuits are controlled by two self-heated thermistors 36 which are incorporated in their respective feedback paths. A condenser 35 which passes radio frequencies but blocks audio frequencies and direct current is, as before, connected in series with each thermistor 36.

The main heating path for one of the thermistors 36 consists of a series combination of a battery 39, a first multigrid tube 40, the secondary winding 58 of a transformer 59, a radio frequency choke 42, and the thermistor 36.

The negative side of the battery 39 is grounded and the positive side is connected to the plate of the first multigrid tube 40. The cathode of the first multigrid tube 40 is connected to the secondary winding 58 of the transformer 59. Since the side of the thermistor 36 away from the radio frequency choke 42 is grounded, the circuit is complete. A condenser 50 furnishes an audio frequency path between the cathode of the first tube 40 and ground.

The heating path for the other thermistor 36 consists of a series combination of a battery 39, a second multigrid tube 40, the secondary winding 60 of a second transformer 61, a radio frequency choke 42, and the thermistor 36. The negative side of the battery 39 is grounded and the positive side is connected to the plate of the second multigrid tube 40. The cathode of the second tube 40 is connected to the secondary winding 60 of the transformer 61. Again, the side of the thermistor 36 away from the radio frequency choke 42 is grounded completing the circuit. Here too, a condenser 50 furnishes an audio frequency path between the cathode of the tube 40 and ground.

Two substantially equal series resistances 62 and 63 are connected in parallel with an audio frequency source 43. The primary windings 64 and 65 of the transformers 59 and 61, respectively, are connected in series and the combination is also placed in parallel with the audio frequency source 43. In this manner, currents are set up in the thermistors 36. The resistances 62 and 63 and the primary windings 64 and 65 form the four arms of a bridge circuit. Assuming that the two transformers 59 and 61 are substantially identical, if the resistances of the two thermistors 36 are equal the bridge will be balanced. If they are not equal, the bridge will not be balanced and an unbalance voltage will appear across the primary winding 66 of a third transformer 67. This primary winding 66 is connected from a point between the two resistances 62 and 63 to a point between the primary windings 64 and 65 of the first two transformers 59 and 61, respectively.

The secondary winding 68 of the third transformer 67 is connected between ground and the first grid of a pentagrid converter tube 69. The primary winding 70 of a fourth transformer 71 is connected in parallel with the audio frequency source 43. One end of the secondary winding 72 of this fourth transformer 71 is connected to the positive side of a biasing battery 108, the negative side of which is grounded. The other end of the secondary winding 72 is connected to the second grid of the pentagrid converter 69. A biasing resistor 73 is connected between the cathode of the converter 69 and ground. The exact operating biases for the first two grids of the converter 69 depend upon the particular type of tube which is used. The biasing battery 108 and the biasing resistor 73 are chosen so as to make the converter 69 operate with both the first and second grids near cut-off, i. e., conducting substantially during only positive half cycles of grid current. The plate of the converter 69 is connected through a resistance 74 to the positive side of a battery 75. The negative side of the battery 75 is grounded. A condenser 76, offering a low impedance at audio frequencies, is connected in parallel with the series combination of the resistance 74 and the battery 75. The plate of the pentagrid converter tube 69 is also connected to the screen grid of the second multigrid tube 40, in the heating circuit of the second thermistor 36.

The amplitude and phase of the voltage appearing on the second grid of the converter 69 are both fixed by the audio frequency source 43. The amplitude of that appearing on the first grid, on the other hand, is dependent on the amount of unbalance in the bridge. This voltage is of either the same or the opposite phase as that on the second grid, depending on the direction of the unbalance. Since the tube 69 is being operated with both grids near cut-off, the output consists of substantially a positive voltage loop every half cycle. If no unbalance voltage is present on the first grid, the output will be fixed and have a certain direct component. If an unbalance voltage exists and is in phase with the voltage from the source 43, the output voltage loops will be larger and the direct component will be greater. If the unbalance voltage is opposite in phase the loops will be smaller and the direct component will be less than that which would exist if there were no unbalance. All audio and higher frequency components of the output wave of the pentagrid converter tube 69 travel through the condenser 76 to ground. The remaining direct voltage is applied to the screen grid of the second multigrid tube 40, which controls the heating current flowing through the second thermistor 36.

As in the previous example, the general level of the gain of the thermistor-controlled amplifiers is under the control of a rectified pilot voltage. This rectified pilot voltage is applied to the control grids of both multigrid tubes 40. The positive terminal of an additional battery 57, the negative terminal of which is grounded, is connected to the screen grid of the first multigrid tube 40. The voltage output of this battery 57 is equal to the direct voltage component of the output of the pentagrid converter tube 69. The thermistor heating current through each multigrid tube 40 is thus affected equally by changes in the amplitude of the pilot signal. If the resistances of the two thermistors 36 are not equal, the bridge will not be balanced and the resulting unbalance signal will either increase or decrease the potential of the screen grid of the second multigrid tube 40, changing the heating current flowing through the second thermistor 36, and causing a change in resistance in the direction required to remove the unbalance.

Figure 4:
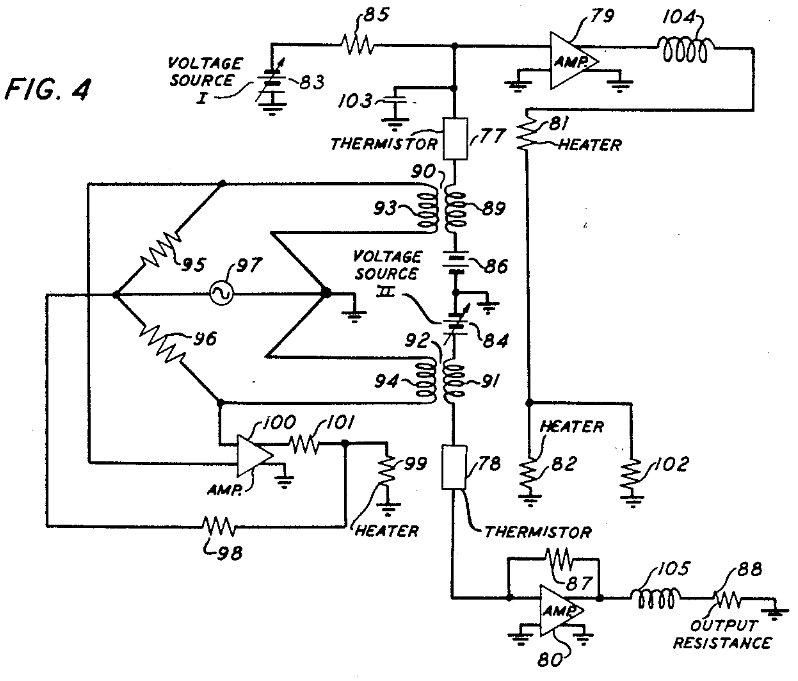
Fig. 4 illustrates a voltage multiplying circuit and means in accordance with the present invention for obtaining a high degree of accuracy in its operation.

Still another embodiment of the present invention is shown in Fig. 4. In this particular example, a circuit for obtaining an output voltage proportional to the product of two input voltages employs two indirectly heated thermistors 77 and 78. The resulting voltage multiplication will be exact only if the two thermistors 77 and 78 have identical heater current versus resistance characteristics. In accordance with this embodiment of the invention, however, means is provided to equalize the resistances of the two thermistors 77 and 78, despite any slight dissimilarity in their heater current versus resistance characteristics, under substantially all conditions by controlling the relative amounts of heater current associated with each.

Referring now to Fig. 4, the particular example of a voltage multiplier shown employs two high gain direct current amplifiers 79 and 80, the two indirectly heated thermistors 77 and 78, and heaters 81 and 82 for the thermistors 77 and 78, respectively. Self-heating in the thermistors 77 and 78 will be assumed to be negligible. Direct current sources 83 and 84 furnish slowly varying direct voltages, which are the voltages to be multiplied. The negative side of the first direct current source 83 is connected through a resistance 85 to one terminal of the first thermistor 77 and the positive side is grounded. The other terminal of the first thermistor 77 is connected to the positive side of a fixed biasing battery 86, the negative side of which is grounded and connected to the negative side of the second direct current source 84. The positive side of the second source 84 is connected to one terminal of the second thermistor 78. The other terminal of the second thermistor 78 is connected to the input side of one of the direct current amplifiers 80. This amplifier 80 is shunted by a resistance 87 which acts as a negative feedback circuit. The output side of the direct current amplifier 80 is connected through a resistance 88 to ground. The input side of the other direct current amplifier 79 is connected to a point between the resistor 85 and the first thermistor 77. The output side of the other amplifier 79 is connected to the heater 81 which is associated with the first thermistor 77. The other side of this heater 81 is connected through the other heater 82, which is associated with the second thermistor 78, to ground.

By ordinary action of feedback amplifiers, the output voltage of the direct current amplifier 79 will adjust itself so that the currents flowing to and from the grid of the first stage will cancel each other. In other words, the amplifier 79 output will force enough current through the heater 81 so that the resistance of the first thermistor 77 will alter until the current set up in the resistance 85 by the first source 83 cancels that set up in the thermistor 77 by the biasing battery 86. The same current flowing through the first heater 81 flows through the second heater 82. Assuming, for the moment, that the thermistors 77 and 78 have equal resistances for equal heater currents, this makes the resistance of the second thermistor 78 equal to that of the first thermistor 77. Thus, the resistance of the second thermistor 78 is varied under control of the voltage output of the first direct current source 83.

The second direct current source 84 sends current through the second thermistor 78. This current is fed into the direct current amplifier 80. By feedback action of the amplifier 80, as was the case with the other amplifier 79, the output voltage adjusts itself so that the currents flowing to and from the grid of the first stage cancel each other and hold the grid at very nearly ground potential. The current flowing back through the shunt feedback resistor 87 will equal that set up in the thermistor 78 by the second source 84. Since the output voltage of the amplifier 80 is the same as that appearing across the feedback resistor 80, it is proportional to the current in the thermistor 78 or, in other words, directly proportional to the voltage of the second source 84 and inversely proportional to the resistance of the second thermistor 78. Since feedback action of the other amplifier 79 forced the resistance of the first thermistor 77 to adjust until the current set up in it by a fixed biasing battery 86 was equal to that set up in a fixed resistance 85 by the first direct current source 83, the resistance of the first thermistor is inversely proportional to the magnitude of the voltage of the first source 83. Under our assumption, the resistances of the two thermistors 77 and 78 are equal for equal heater currents. Therefore, the output voltage of the second amplifier 80 is directly proportional to both the voltage of the second source 84 and that of the first source 83 or, in other words, their product. This output voltage may be picked off from the output resistance 88.

Since the accuracy of the voltage multiplication is dependent upon the ability of the thermistors 77 and 78 to maintain equal resistances for equal heater currents, it is highly advantageous to employ an embodiment of the present invention to insure such accuracy. In this embodiment of the invention, the secondary winding 89 of a transformer 90 is connected in series with the first thermistor 77 and the biasing battery 86 of the voltage multiplier circuit. The secondary winding 91 of another transformer 92 is connected in series with the second voltage source 84 and the second thermistor 78. The primary windings 93 and 94 of the transformers 90 and 92, respectively, are then connected in series and form two arms of a bridge circuit. Two substantially equal resistances 95 and 96 are connected in series and, when the combination is connected in parallel with the series connected primary transformer windings 93 and 94, form the other two arms of the bridge.

An alternating current source 97 is connected between the pair of opposite bridge terminals formed by the junctions of the resistances 95 and 96 and of the primary transformer windings 93 and 94. The terminal formed by the junction of the primary windings 93 and 94 is grounded. The terminal formed by the junction of the resistances 95 and 96 is connected through another resistance 98 to one side of an additional heater 99 for the second thermistor 78, the other side of the heater 99 being grounded. The two remaining bridge terminals are connected to the input terminals of a high gain amplifier 100. One output terminal of the high gain amplifier 100 is grounded and the other is connected through a resistance 101 to the ungrounded side of the additional heater 99. The regular heater 82 for the second thermistor 78 is shunted by a resistance 102 for the purpose of reducing the heating effect of the regular heater 82 to accommodate that of the additional heater 99.

Several additions are necessary in the voltage multiplier circuit to prevent the alternating current which has been introduced from interfering with its operation. A condenser 103 is connected between ground and a point between the first thermistor 77 and the resistance 85, blocking direct current but forming a path for alternating current. An inductance 104 is connected between the first direct current amplifier 79 and the heater 81 to block alternating current from the heater circuit. An additional inductance 105 is connected between the second direct current amplifier 80 and the output resistance 83 to block alternating current from the output circuit.

A biasing voltage is applied to the additional heater 99 from the alternating current source 97 through the isolating resistance 98. The value of the resistor 102 shunting the regular heater 82 of the second thermistor 78 is chosen so as to make the total heating effect of the two heaters 82 and 99 equal to the original heating effect of the regular heater 82 alone. If the resistances of the two thermistors 77 and 78 are equal, the bridge will be balanced and no correction will be made. However, if the resistances of the two thermistors 77 and 78 are not equal, the bridge will not be balanced and an unbalance voltage will appear across the input terminals of the high gain amplifier 100, the amplitude of the unbalance voltage depending on the amount of unbalance and the phase depending on its direction. The output of the amplifier 100 is fed through the other isolating resistor 101 to the additional heater 99. The isolating resistors 98 and 101 force the currents through them to add vectorially and enter the heater 99. The resultant voltage which is applied to the heater 99 is greater than the bias if the unbalance voltage is in phase with the alternating current source voltage and is less than the bias if the unbalance voltage is opposite in phase. This resultant signal tends to either raise or lower the resistance of the second thermistor 78, removing the unbalance and equalizing the resistances of the two thermistors 77 and 78.

The specific embodiments of the invention which have been described are illustrative of the applications which are possible. In these and other embodiments, different combinations of frequencies, different circuit configurations, and different circuit elements may be used to advantage. Many other embodiments of the general principles involved in the present invention may be made within the spirit and scope of the appended claims.

What is claimed is:

1. In combination, two current-controlled variable resistances having substantially similar resistance versus control-current characteristics, a source of current, connections from said source to each of said variable resistances, means to compare the currents flowing from said source to each of said variable resistances, and means responsive to said comparison means for maintaining substantial equality between the resistances of said variable resistances.

2. A combination in accordance with claim 1 in which said last-mentioned means includes means to change the control current of only one of said variable resistances in any one direction.

3. A combination in accordance with claim 1 in which said last-mentioned means includes means to change the control current of only one of said variable resistances.

4. A combination in accordance with claim 1 in which said last-mentioned means includes means to increase the control current of one of said variable resistances and means to decrease the control current of the other of said variable resistances.

5. In combination, two current-controlled variable resistances having substantially similar resistance versus control-current characteristics, a source of voltage, two transformers, connections from one winding of one of said transformers to one of said variable resistances, connections from one winding of the other of said transformers to the other of said variable resistances, connections from said source to each of the remaining windings of said transformers, means to compare the currents set up by said source in each of said variable resistances, and means responsive to said comparison means for maintaining substantial equality between the resistances of said variable resistances.

6. In combination, two indirectly heated thermistors having substantially similar resistance versus temperature characteristics, external electrical heating units for each of said elements, a voltage source, connections from said source to said heating units, an additional heating unit for one of said thermistors, an additional voltage source, connections from said additional source to each of said thermistors, means to compare the currents set up by said additional source in each of said thermistors, and means responsive to said comparison means for maintaining substantial equality between the resistances of said thermistors by adjusting the temperature of said additional heating unit.

7. In combination, two indirectly heated thermistors having substantially similar resistance versus temperature characteristics, means for detlcting any difference between the resistances of said thermistors comprising a voltage source, two transformers, and two substantially equal resistances, the primary windings of said transformers and said substantially equal resistances forming a bridge circuit to compare the currents set up by said source in each of said thermistors, the secondary windings of said transformers being connected to said thermistors, and said source being connected between two opposite terminals of said bridge, an additional external heating unit for one of said thermistors, and means responsive to any unbalance in said bridge connected to said additional external heating unit for modifying the resistance of its associated thermistor so as to balance said bridge and remove any difference between the resistances of said thermistors.

8. A combination, according to claim 7, in which said means responsive to any bridge unbalance comprises a high gain amplifier, connections from the remaining pair of terminals of said bridge to the input side of said amplifier, connections from the output side of said amplifier to said additional heating unit, and connections from said voltage source to said additional heating unit.

9. In combination, a pair of thermistors having substantially similar resistance versus temperature characteristics, a source of voltage, circuit means for applying voltage from said source to each of said thermistors and thereby establishing currents in each of said thermistors, means for comparing said currents comprising a bridge circuit that is balanced when said currents maintain substantial equality, means for detecting any bridge unbalance, and means responsive to any unbalance detected by said detecting means for altering the resistance of at least one of said thermistors in such direction as to cause said currents to regain substantial equality, thereby causing said bridge to regain said balance.

10. A combination in accordance with claim 9 in which said last-mentioned means includes means to change the temperature of only one of said thermistors in any one direction.

11. A combination in accordance with claim 9 in which said last-mentioned means includes means to change the temperature of only one of said thermistors.

12. A combination in accordance with claim 9 in which said last-mentioned means includes means to increase the temperature of one of said thermistors and means to decrease the temperature of the other of said thermistors.

13. In combination, two current-controlled variable resistances having substantially similar resistance versus control-current characteristics, mean for comparing the resistances of said variable resistances comprising two transformers, at least one of said transformers having a divided secondary winding, a voltage source, and connections from said source to the primary winding of one of said transformers having a divided secondary winding, said means forming a bridge circuit, two adjacent arms of said bridge circuit being the portions of said divided secondary winding, the other two adjacent arms being said variable resistances, and the primary winding of the other of said transformers being connected from a point between the portions of said secondary winding to a point between said variable resistances, and means responsive to said comparison means connected to the secondary winding of the other of said transformers for maintaining a predetermined relation between the resistances of said variable resistances.

14. In combination, two current-controlled variable resistances having substantially similar resistance versus control-current characteristics, two electrical discharge devices, a source of direct current, connections to carry current from said source through one of said discharge devices to one of said variable resistances, connections to carry current from said source through the other of said discharge devices to the other of said variable resistances, a source of alternating current, connections from said alternating current source to each of said variable resistances, means to compare the currents set up in said variable resistances by said alternating current source, and means responsive to said comparison means for maintaining a predetermined relation between the resistances of said variable resistances by modifying the flow of direct current through at least one of said discharge devices.

15. A combination in accordance with claim 14 in which said last-mentioned means comprises means for maintaining equality between the resistances of said variable resistances.

16. A combination in accordance with claim 14 in which said last-mentioned means includes means to change the control current of only one of said variable resistances.

17. A combination in accordance with claim 14 in which said last-mentioned means includes means to increase the control current of one of said variable resistances and means to decrease the control current of the other of said variable resistances.

18. In combination, two amplifier circuits, two current-controlled variable resistances having substantially similar resistance versus control-current characteristics, one of said variable resistances being connected in a gain-controlling relation to each of said amplifier circuits, a source of current, connections from said source to each of said variable resistances, means to compare the currents flowing from said source to each of said variable resistances, and means responsive to said comparison means for maintaining a predetermined relation between the resistances of said variable resistances, thereby maintaining a predetermined relation between the gains of said amplifier circuits.

19. In a system containing two distinct amplifier circuits and two current-controlled variable resistances having substantially similar resistance versus control-current characteristics, each of said amplifier circuits having one of said variable resistances connected in a gain-controlling relation, a source of variable control voltage, means for varying the general level of the gains of said amplifier circuits under the control of variations in said control voltage by varying the resistances of said variable resistances, a source of calibrating voltage, connections from said calibrating voltage source to each of said variable resistances, means to compare the currents flowing from said calibrating source to each of said variable resistances, and means responsive to said comparison means for maintaining a predetermined relation between the resistances of said variable resistances, thereby maintaining a predetermined relation between the gains of said amplifiers.

20. In combination, a signal transmission line, a pair of amplifier circuits connected in parallel with each other incorporated in said transmission line, a pair of self-heated thermistors having substantially similar resistance versus temperature characteristics, one of said thermistors being connected in a gain-controlling relation in each of said amplifier circuits, a source of pilot voltage operating at a frequency different from the signal frequency of the line, connections from said pilot voltage source to said transmission line to enable the pilot voltage to be transmitted over said line, at least one circuit for filtering the pilot voltage from the main signal, connections from said line to said filter circuit, means for rectifying said pilot voltage, connections from said filter circuit to said rectifying means, connections from said rectifying means to each of said thermistors, thereby enabling the general level of resistance of said thermistors to be varied under the control of variations of said pilot voltage, an additional alternating current source operating at a frequency different from the main signal frequency, connections from said additional source to each of said thermistors, means for comparing the currents flowing from said additional source in said thermistors, and means responsive to said comparison means for maintaining a predetermined relation between the resistances of said thermistors, thereby maintaining a predetermined relation between the gains of said amplifier circuits.

21. In combination, two amplifier circuits, each of said amplifier circuits transmitting an alternating current signal, two current-controlled variable resistances having substantially similar resistance versus temperature characteristics, one of said variable resistances being connected in a gain-controlling signal-transmitting relation in each of said amplifier circuits, an alternating current source operating at a frequency different from the main signal frequency, connections from said source to each of said variable resistances, means to confine said signal to said amplifier circuits, means to confine current from said source to said variable resistances and said connections from said source, means to compare the currents in each of said variable resistances set up by said source, and means responsive to said comparison means for maintaining a predetermined relation between the resistances of said variable resistances, thereby maintaining a predetermined relation between the gains of said amplifier circuits.

22. In combination, a signal translating circuit including a pair of impedance elements having substantially similar high temperature coefficients of resistance, each of said elements connected to be traversed by translated signals, a pair of circuits each including a respective one of said impedance elements and a common voltage source for passing through each of said elements a current of a strength insufficient to substantially affect the resistance thereof and which is dependent upon the resistance of said element, circuit means, including a source of heating current, for altering the temperature of one of said elements relative to the temperature of the other, means for comparing said currents established by said common voltage source in said elements, and means including said circuit means and actuated by said last-mentioned comparison means for maintaining a predetermined relation between said compared currents, whereby a predetermined relation between the respective resistances of said elements is accurately maintained.

23. A combination in accordance with claim 22 in which the frequency of the translated signals and the frequency of said comparison currents are different, and with frequency selective means connected into said combination to exclude the signal from the comparison circuit.

EMORY LAKATOS.
BROCKWAY McMILLAN.

REFERENCES CITED

The following references are of record in the file of this patent:

UNITED STATES PATENTS

| Number | Name | Date |
|---|---|---|
| 2,104,336 | Tuttle | Jan. 4, 1938 |
| 2,126,529 | Black | Aug. 9, 1938 |
| 2,206,080 | Davis | July 2, 1940 |
| 2,209,667 | Taylor | July 30, 1940 |
| 2,278,633 | Bagnall | Apr. 7, 1942 |
| 2,412,227 | Och et al. | Dec. 10, 1946 |

FOREIGN PATENTS

| Number | Country | Date |
|---|---|---|
| 366,920 | Great Britain | Feb. 8, 1932 |